(12) United States Patent
Lipsky et al.

(10) Patent No.: US 8,260,710 B2
(45) Date of Patent: *Sep. 4, 2012

(54) METHOD AND SYSTEM FOR SECURELY DISTRIBUTING CONTENT

(75) Inventors: Scott E. Lipsky, Seattle, WA (US); Paul Brownlow, Seattle, WA (US)

(73) Assignee: Eqapez Foundation, L.L.C.

( * ) Notice: Subject to any disclaimer, the term of this patent is extended or adjusted under 35 U.S.C. 154(b) by 313 days.

This patent is subject to a terminal disclaimer.

(21) Appl. No.: 12/581,077

(22) Filed: Oct. 16, 2009

(65) Prior Publication Data

US 2010/0115253 A1    May 6, 2010

Related U.S. Application Data

(63) Continuation of application No. 10/868,586, filed on Jun. 15, 2004, now Pat. No. 7,624,072.

(51) Int. Cl.
*G06Q 99/00* (2006.01)
(52) U.S. Cl. ............... 705/54; 705/56; 705/57; 705/51; 705/52; 713/1; 717/174; 726/27; 726/29; 726/30
(58) Field of Classification Search .................. None
See application file for complete search history.

(56) References Cited

U.S. PATENT DOCUMENTS

| | | | |
|---|---|---|---|
| 5,060,263 A | | 10/1991 | Bosen et al. |
| 5,623,546 A * | | 4/1997 | Hardy et al. ............... 713/193 |
| 5,706,457 A | | 1/1998 | Dwyer et al. |
| 5,963,142 A * | | 10/1999 | Zinsky et al. ............... 340/5.74 |
| 6,023,506 A * | | 2/2000 | Ote et al. ............... 713/165 |
| 6,351,817 B1 * | | 2/2002 | Flyntz ............... 726/4 |
| 6,389,542 B1 * | | 5/2002 | Flyntz ............... 726/17 |
| 6,643,783 B2 * | | 11/2003 | Flyntz ............... 726/9 |
| 7,069,591 B1 * | | 6/2006 | Weicher ............... 726/26 |
| 7,313,699 B2 * | | 12/2007 | Koga ............... 713/170 |
| 8,051,297 B2 * | | 11/2011 | Machani ............... 713/185 |
| 2002/0071139 A1 | | 6/2002 | Janik |
| 2002/0116632 A1 * | | 8/2002 | Itoh et al. ............... 713/200 |
| 2002/0147924 A1 * | | 10/2002 | Flyntz ............... 713/200 |
| 2002/0176583 A1 | | 11/2002 | Buttiker |
| 2004/0194083 A1 * | | 9/2004 | Hindle et al. ............... 717/174 |
| 2006/0005255 A1 | | 1/2006 | Lipsky et al. |
| 2006/0010503 A1 * | | 1/2006 | Inoue et al. ............... 726/30 |
| 2006/0064605 A1 | | 3/2006 | Giobbi |

* cited by examiner

*Primary Examiner* — Jacob C. Coppola
(74) *Attorney, Agent, or Firm* — Perkins Coie LLP

(57) ABSTRACT

A system for securely distributing content is provided. A distribution system includes a content server that distributes content to content clients via a communications link or a tangible medium. The distribution system uses passwords to encrypt and decrypt content and to control access to sensitive information stored on the content clients. The distribution system initially receives various passwords from a user and encrypts each password. Some of the encrypted passwords are "identification passwords" and others are "encryption passwords." The identification passwords are used to control access to sensitive information stored on the content clients, and the encryption passwords are used to encrypt and decrypt content that is distributed to the content clients. The distribution system configures each content client to contain the identification passwords and encryption passwords in a secure folder.

35 Claims, 7 Drawing Sheets

METHOD AND SYSTEM FOR SECURELY DISTRIBUTING CONTENT

CROSS-REFERENCE TO RELATED APPLICATION

This patent application is a continuation of U.S. patent application Ser. No. 10/868,586, filed on Jun. 15, 2004, entitled "METHOD AND SYSTEM FOR SECURELY DISTRIBUTING CONTENT".

TECHNICAL FIELD

The described technology relates generally to distribution of content and particularly to the secure distribution of content from a content server to content clients.

BACKGROUND

The displaying of paintings, sketches, photographs, and other images is very popular in business and personal settings. For example, most homes and offices have paintings or photographs on their walls. It can be very expensive, however, to purchase, maintain, and display high-quality paintings—so much so that most businesses and families cannot afford to do so. As a result, most images that are displayed are low-cost reproductions of high-quality paintings or originals of low-quality paintings. Because viewers can tire of seeing the same painting on a daily basis, some businesses change the location of the paintings that they display to provide more variety to their customers and employees.

Various electronic means have been used to display images to help reduce the cost of displaying images and increase the variety of images that are displayed. For example, slide programs for general-purpose computers have been developed to display images (e.g., stored in JPEG format) on display devices such as a computer monitor. These slide shows typically cycle through displaying a set of images (e.g., defined by a display list) at a fixed rate. Some electronic frames have been developed that allow a user to upload their own photographs for display on a screen within the frame. These electronic frames, much like a slide show program, cycle through displaying a set of photographs. It can be a time-consuming process, however, to change the set of images that are displayed either by a slide show program or an electronic picture frame. To change a set of images, a person may need to search for, pay for, and download an electronic version of an image and then create a display list that includes that image.

An image distribution system has been developed to distribute images from an image distribution server to image display clients. The distribution server periodically distributes packages of images to the image display clients for display on a display device (e.g., a high-resolution, flat-panel monitor). The distributor of the images may have licensed the images from various organizations, such as art museums, and needs to assure those organizations that the images will only be used as authorized by the license. It is important that the images be distributed to the image display clients and used by the image display clients in such a way as to ensure that only authorized use of the images is permitted. It would be desirable to have a technique for distributing the images to the image display clients in a way that would make unauthorized use virtually impossible.

DETAILED DESCRIPTION

Figure 1:
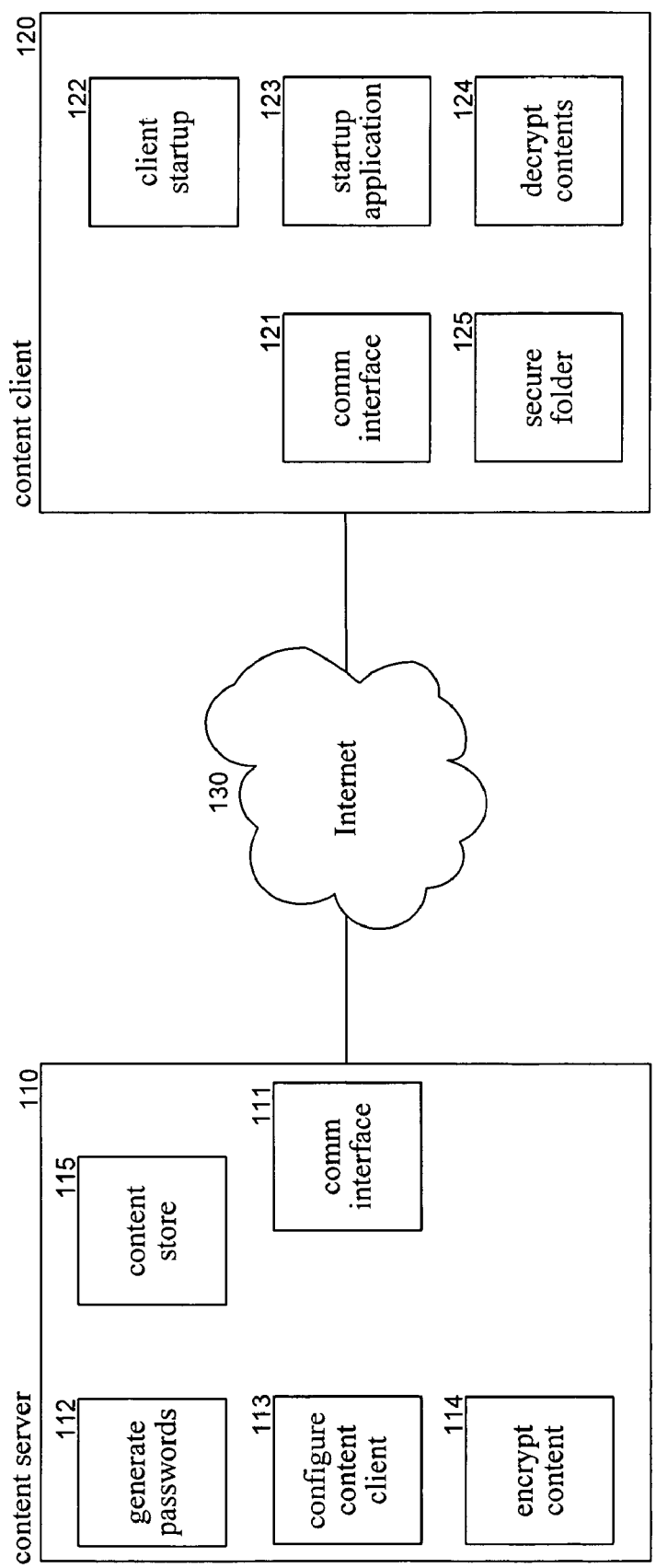
FIG. 1 is a block diagram illustrating components of the distribution system in one embodiment.

A method and system for securely distributing content, such as images, is provided. In one embodiment, the distribution system includes a content server that distributes content to content clients via a communications link or a tangible medium. The distribution system uses passwords to encrypt and decrypt content and to control access to sensitive information stored on the content clients. The distribution system initially receives various passwords from a user. These passwords may be generated by any technique and may be relatively long to make reverse engineering of the passwords difficult. Upon receiving the passwords, the distribution system encrypts each password using an encryption technique that may be a standard or a custom technique and may be different for each password. Some of the encrypted passwords are referred to as "identification passwords," and others are referred to as "encryption passwords." The identification passwords are used to control access to sensitive information stored on the content clients, and the encryption passwords are used to encrypt and decrypt content that is distributed to the content clients. The distribution system configures each content client to contain the identification passwords and encryption passwords (e.g., on a disk drive) in a secure folder.

To ensure the security of the passwords stored on the content clients, the distribution system creates via the operating system of each content client a secure administrative account. Access to the secure administrative account of each content client is controlled via a "client-specific password." The operating system may store the client-specific password securely to verify that a user or program that is attempting to log on to the administrative account is authorized. The operating system may encrypt the identification and encryption passwords so that they can only be accessed via the administrative account. The distribution system may create a client-specific password for each content client by combining the identification passwords and client-specific attributes, such as the serial number of a processor of the content client. The distribution system configures each content client to launch a startup application under the administrative account when the content client boots up. The operating system may use its security mechanism to store the client-specific password for logging on to the administrative account when launching the startup application. When the startup application is launched, it can access the identification passwords and encryption passwords because it is launched in the administrative account. The startup application can generate the client-specific password using the identification passwords and the client-specific attributes. The startup application can then launch other applications or services under the administrative account using the generated client-specific password.

The distribution server encrypts content by serially encrypting the content using the encryption passwords in an order that is known to the content clients. The distribution server then sends the encrypted content to the content clients. The startup application of each content client can launch a decryption service under the administrative account using the generated client-specific password. The decryption service is responsible for decrypting content that is received from the distribution server. To decrypt the content, the decryption service retrieves the encryption passwords (which it can access because it was launched in the administrative account) and serially applies the encryption passwords in reverse order of encryption.

In this way, the distribution system can help ensure that the content is distributed to the content clients in a way that would make an unauthorized use extremely difficult. In particular, the encryption of the passwords helps ensure that it would be difficult for someone to reverse engineer the unencrypted passwords. The difficulty may be increased when the provider of the distribution system places procedures in place so that no one person knows the unencrypted passwords, the password encryption algorithm, the content encryption algorithm, and the client-specific password generation algorithm. Also, since the passwords are not transmitted via the communications link, they cannot be intercepted by an unauthorized user. If content, which may be transmitted via a communications link, does fall into the hands of an unauthorized user, that user could not use the content without gaining access to the encryption passwords and determining the particular algorithm used to encrypt the content. Although the unauthorized user may have access to a content client, that user could not access the passwords stored in the secure folder without breaching the security mechanism of the operating system or somehow identifying the client-specific password. Even if an unauthorized user did gain access to the secure folder, the user would still need to find the encryption passwords and to reverse engineer the content encryption algorithm.

FIG. 1 is a block diagram illustrating components of the distribution system in one embodiment. The distribution system includes content server 110 connected to content clients 120 via a communications link 130, such as the Internet. The content server periodically distributes new content, such as images, to the content client. The content server includes a communications interface 111, a generate passwords component 112, a configure content client component 113, and an encrypt content component 114. The communications interface provides an interface to the communications link for distributing content to the content clients. The generate passwords component generates the encrypted identification and encryption passwords. The configure content client component helps control the configuration of the content client systems. The content clients are configured prior to being provided to the users of the content clients. The encrypt content component encrypts the content and stores the encrypted content in content store 115 for distribution to the content clients. Each content client includes a communications interface 121, a client startup component 122, a startup application component 123, and a decrypt content component 124. The communications interface component interfaces with the communications link to receive encrypted content from the content server. The client startup component is launched when the content client starts up (e.g., powered up, reset, or booted) and may include instructions to launch the startup application within the administrative account. Since the operating system has stored the client-specific password securely, it can retrieve that password and use it when launching the startup application to establish that it is authorized to launch the application in the administrative account. The startup application generates the client-specific password and launches the decrypt content component in the administrative account. The decrypt content component retrieves the encryption passwords and decrypts content using those passwords. The secure folder 125 is accessible via the administrative account and includes the identification passwords and encryption passwords. The decrypt content component may store the decrypted content in the secure folder.

The computer systems, server and clients, may include a central processing unit, memory, input devices (e.g., keyboard and pointing devices), output devices (e.g., display devices), and storage devices (e.g., disk drives). The memory and storage devices are computer-readable media that may contain instructions that implement the distribution system. In addition, the data structures and message structures may be stored or transmitted via a data transmission medium, such as a signal on a communications link. Various communications links may be used, such as the Internet, a local area network, a wide area network, or a point-to-point dial-up connection. One skilled in the art will appreciate that the functions of the content server may be implemented on different computer systems. For example, one computer system may implement the function to configure the content clients and another the function to distribute the content to the content clients.

Figure 2:
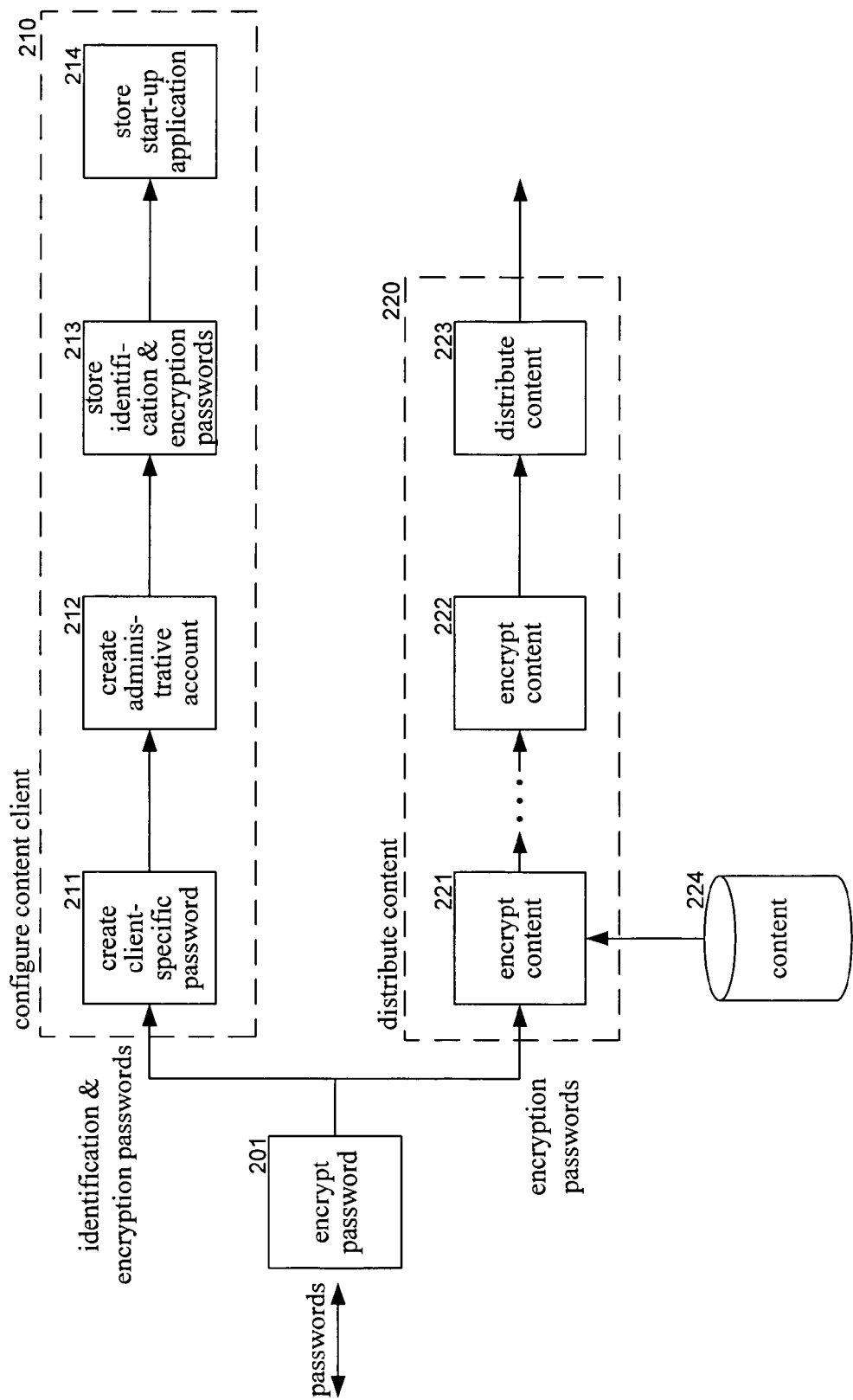
FIG. 2 is a block diagram illustrating the processing of the distribution system in one embodiment.

FIG. 2 is a block diagram illustrating processing of the distribution system in one embodiment. The distribution system receives passwords from a user and encrypts 201 those passwords, which are designated as identification passwords or encryption passwords. One skilled in the art will appreciate that the same encrypted passwords could be used for both identification and encryption. The distribution system configures the content clients, performing a configure content client process 210 for each content client. The process includes creating 211 a client-specific password for each content client, creating 212 an administrative account on the content client that is accessible using the created client-specific password, storing 213 the identification passwords and encryption passwords in a secure folder accessible via the administrative account, and storing 214 the client startup component, the startup application, and other applications and services on the content client. The steps of the configure content client process 210 may be performed by a computer system interacting automatically with a content client, by a user interacting manually with a content client, or by some combination of automatic and manual interactions. The distribute content process 220 is performed whenever content is ready to be distributed to content clients. The distribute content process encrypts 221, 222 the content of the content store 224 serially by successively applying the encryption passwords to the content in an order known to the content clients as reflected in the decryption algorithm of the decrypt content component of the decryption service. The distribute content process then distributes 223 the content to the content clients. The content may be distributed via a communications link or via a tangible medium (e.g., CD-ROM).

Figure 3:
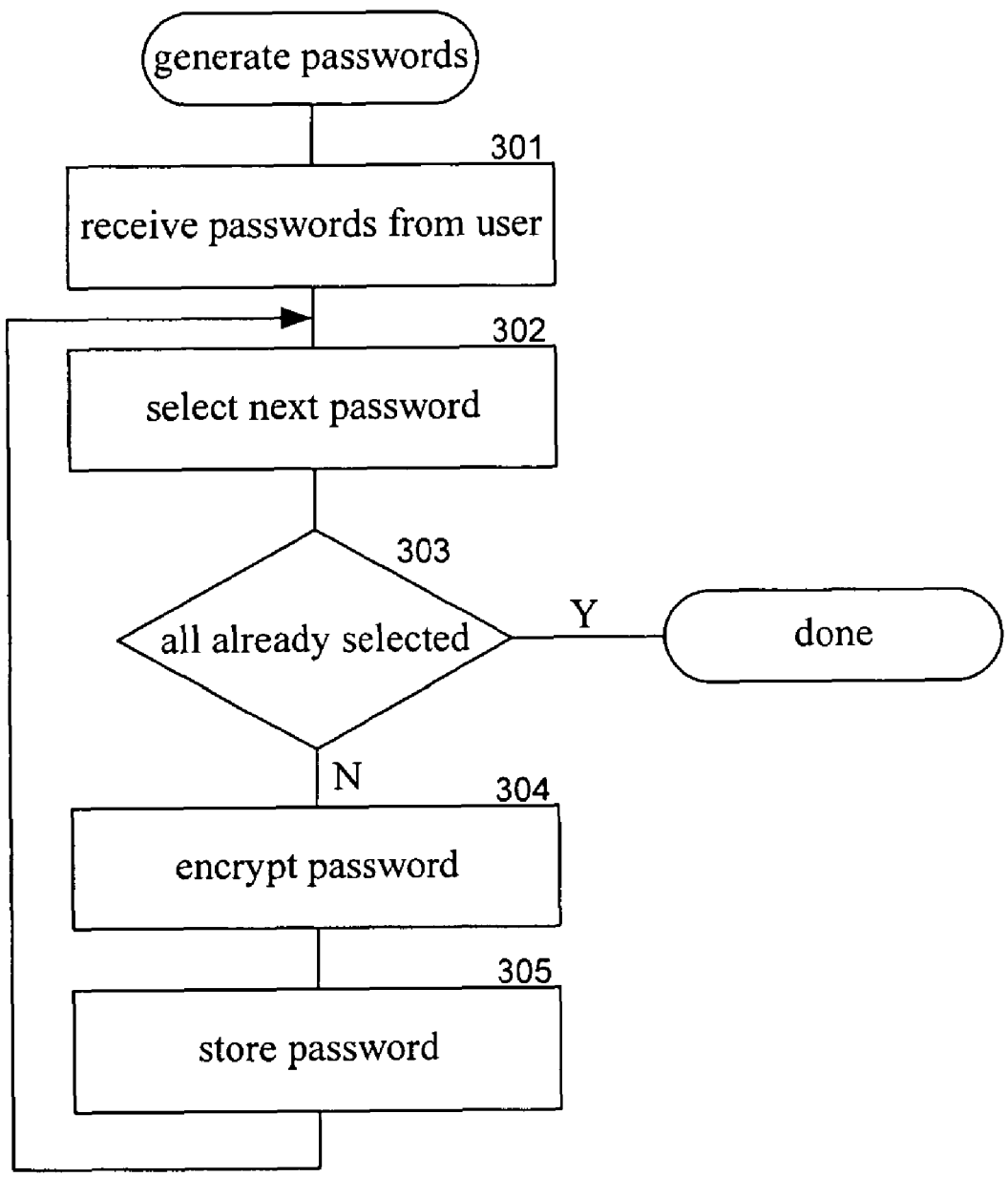
FIG. 3 is a flow diagram illustrating the process of generating passwords by the content server in one embodiment.

FIG. 3 is a flow diagram illustrating the process of generating passwords by the content server in one embodiment. In block 301, the component receives the passwords from a user. In blocks 302-305, the component loops encrypting each password. In block 302, the component selects the next password. In decision block 303, if all the passwords have already been selected, then the component completes, else the component continues at block 304. In block 304, the component encrypts the selected password. In block 305, the component stores the encrypted password and then loops to block 302 to select the next password. One skilled in the art will appreciate that various well-known techniques may be used to encrypt the passwords.

Figure 4:
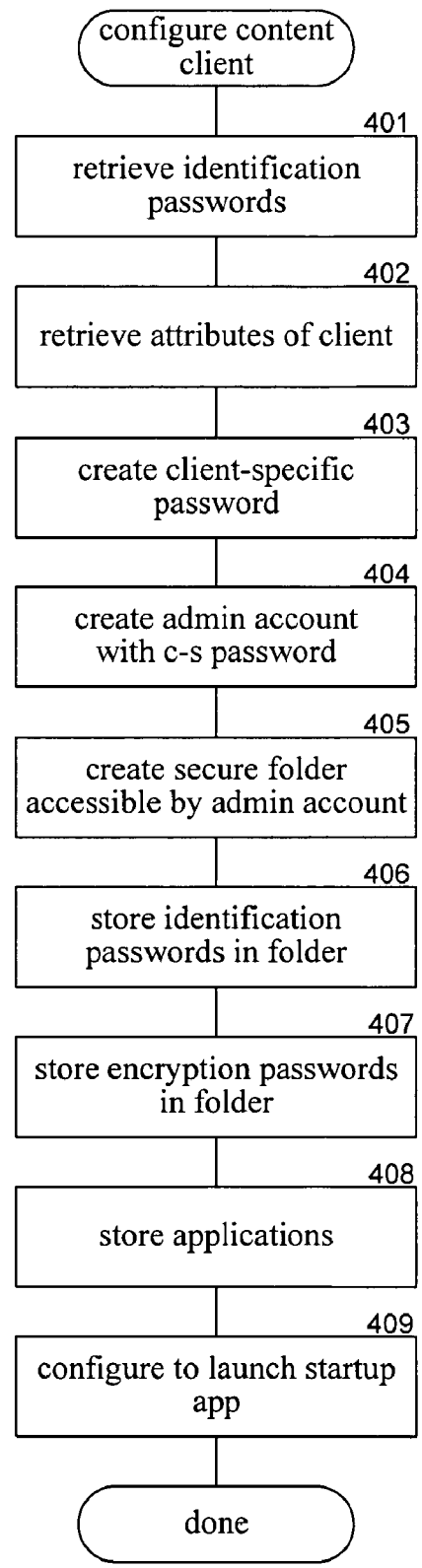
FIG. 4 is a flow diagram illustrating the processing of the configure content client in one embodiment.

FIG. 4 is a flow diagram illustrating the processing of the configure content client in one embodiment. In block 401, the component retrieves the identification passwords. In block 402, the component retrieves the attributes of the content client that are used to generate the client-specific password. In block 403, the component creates a client-specific password by combining the retrieved identification passwords and the retrieved attributes. The component may use any well-known technique for combining such as addition, multiplication, and so on. In block 404, the component creates an administrative account on the content client using the client-specific password. In block 405, the component creates a secure folder on the content client that is accessible via the administrative account. In block 406, the component stores the identification passwords in the secure folder of the content client. In block 407, the component stores the encryption passwords in the secure folder of the content client. In block 408, the component stores the services and applications in the secure folder. In block 409, the component configures the content client to launch the startup application in the administrative account using the client-specific password during initialization of the content client. The component then completes.

Figure 5:
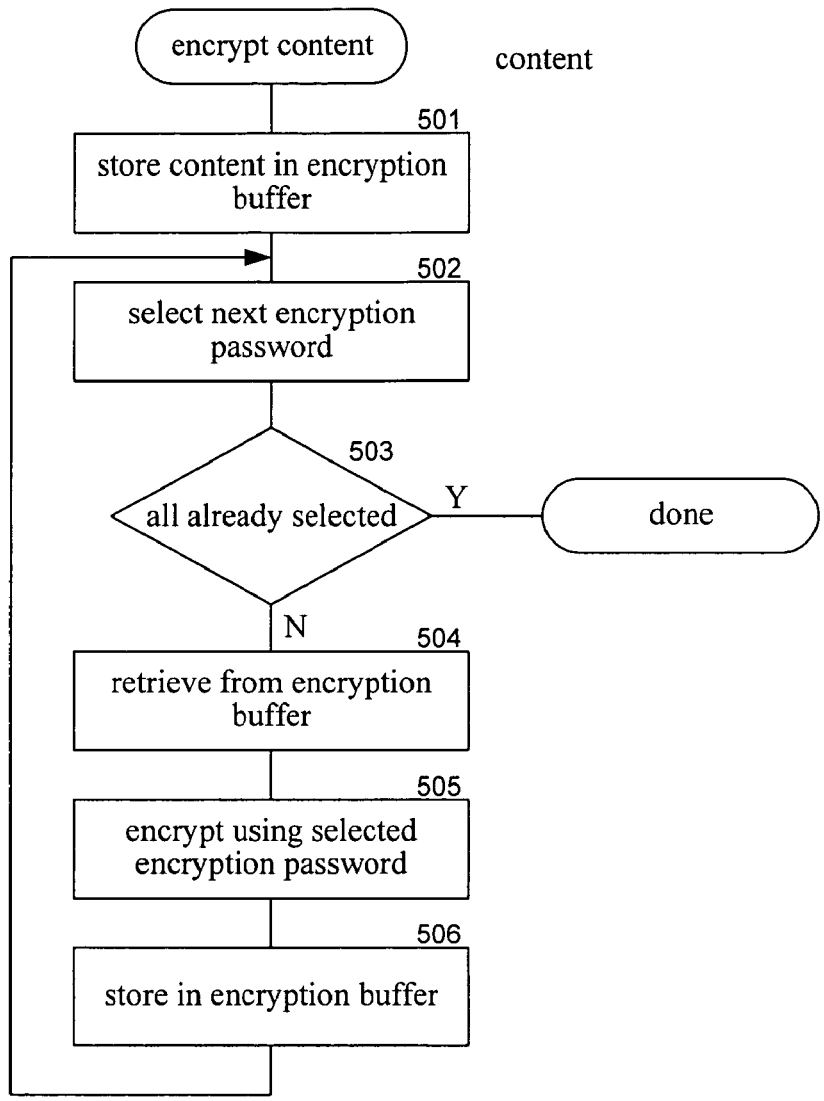
FIG. 5 is a flow diagram illustrating the processing of the encrypt content component of the content server in one embodiment.

FIG. 5 is a flow diagram illustrating the processing of the encrypt content component of the content server in one embodiment. The component is passed the content to be encrypted. In block 501, the component stores the content in an encryption buffer. In blocks 502-506, the component loops encrypting the content multiple times using the encryption passwords in a sequence known to the content clients. In block 502, the component selects the next encryption password in sequence. In decision block 503, if all the encryption passwords have already been selected, then the component completes, else the component continues at block 504. In block 504, the component retrieves the content from the encryption buffer. In block 505, the component encrypts the retrieved content using the selected encryption password. In block 506, the component stores the encrypted content in the encryption buffer and then loops to block 502 to select the next encryption password. One skilled in the art will appreciate that the component may combine certain encryption passwords and use the combined password to encrypt the content. For example, if there are five encryption passwords, then the component may combine pairs of passwords (e.g., 1 and 2, 2 and 3, 3 and 4, 4 and 5) for encrypting the content four times.

Figure 6:
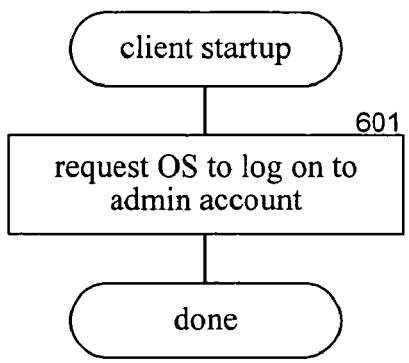
FIG. 6 is a flow diagram illustrating the processing of the client startup component of a content client in one embodiment.

FIG. 6 is a flow diagram illustrating the processing of the client startup component of a content client in one embodiment. In block 601, the component requests the operating system to log on to the administrative account and launch the startup application. The component then completes.

Figure 7:
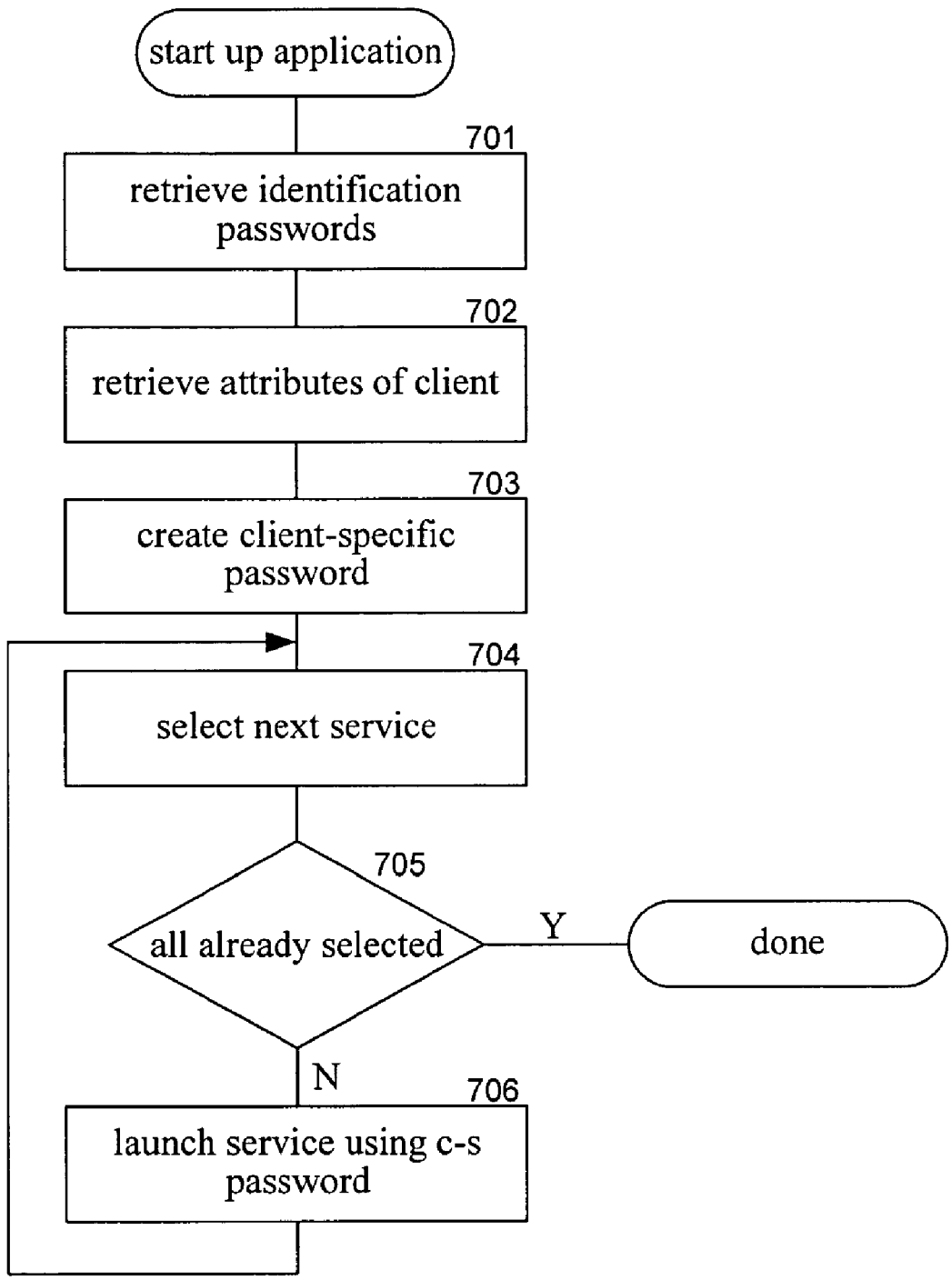
FIG. 7 is a flow diagram illustrating the processing of the startup application of a content client in one embodiment.

FIG. 7 is a flow diagram illustrating the processing of the startup application of a content client in one embodiment. In block 701, the component retrieves the identification passwords from the secure folder. In block 702, the component retrieves the attributes (e.g., a globally unique identifier derived from the hardware or software configuration) of the content client. The attributes may include a processor or network card identifier. In block 703, the component creates the client-specific password using the identification passwords and attributes. In blocks 704-706, the component loops launching each service or application of the content client. In block 704, the component selects the next service to launch.

In decision block 705, if all the services have already been launched, then the component completes, else the component continues at block 706. In block 706, the component launches the selected service (e.g., decrypt component) in the administrative account using the created client-specific password and then loops to block 704 to select the next service. The launched services may themselves create the client-specific password for use in accessing resources of the administrative account.

Figure 8:
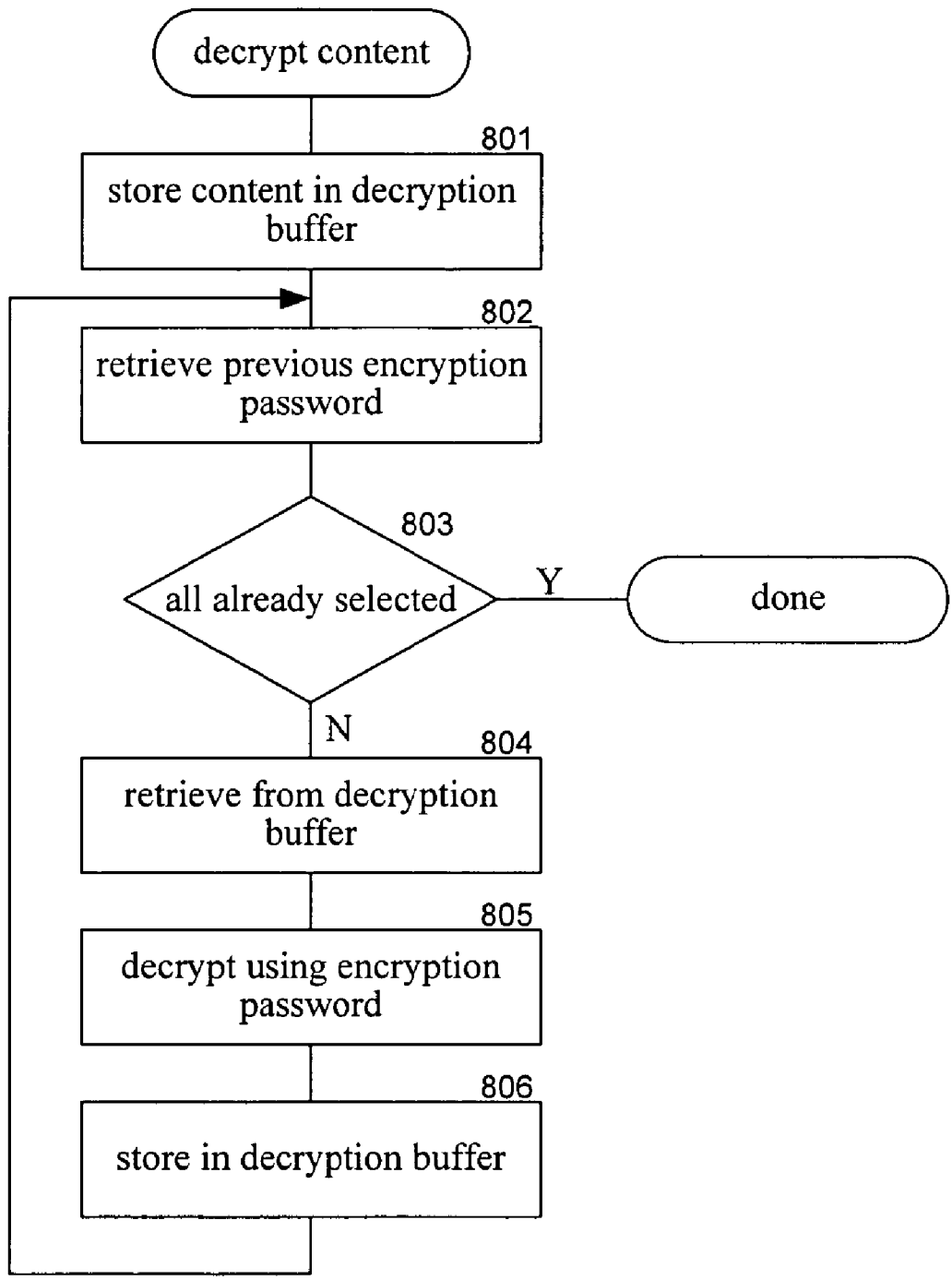
FIG. 8 is a flow diagram illustrating the processing of the decrypt content component of the content client in one embodiment.

FIG. 8 is a flow diagram illustrating the processing of the decrypt content component of the content client in one embodiment. In block 801, the component retrieves the encrypted content and stores it in a decryption buffer. In blocks 802-806, the component loops decrypting the content using the encryption passwords in the reverse order of encryption. In block 802, the component retrieves the previous encryption password starting with the last encryption password used to encrypt the content. In decision block 803, if all the encryption passwords have already been selected, then the decryption buffer contains the decrypted content and the component completes, else the component continues at block 804. In block 804, the component retrieves the content from the decryption buffer. In block 805, the component decrypts the retrieved content using the retrieved encryption password. In block 806, the component stores the decrypted content in the decryption buffer and then loops to block 802 to retrieve the previous encryption password used to encrypt the content.

One skilled in the art will appreciate that although specific embodiments of the distribution system have been described herein for purposes of illustration, various modifications may be made without deviating from the spirit and scope of the invention. One skilled in the art will appreciate that various well-known encryption and decryption algorithms may be used by the distribution system, such as symmetrical and asymmetrical algorithms. For example, the distribution system may generate public and private key pairs and encrypt content using one of the keys of a pair and decrypt content using the other key of the pair. The term "password" as used in this description refers to any information that can be used to log on to an account (e.g., "identification password") or to encrypt or decrypt content (e.g., encrypt/decrypt key or "encryption password"). One skilled in the art will also appreciate that the passwords can be generated automatically by a computer system. As such, the term "user" may refer to a person, software component, or computer system depending on context. One skilled in the art will also appreciate that any number of identification and encryption passwords can be used as well as various client-specific attributes. Accordingly, the invention is not limited except by the appended claims.

We claim:

1. A tangible computer-readable medium having stored thereon instructions that, if executed by a computing system having a processor, cause the computing system to perform operations for distributing content, the operations comprising:

creating an administrative account on a content client;
storing encryption keys in a secure folder of the content client;
installing on the content client a startup application, the startup application programmed to launch a decryption application, the decryption application programmed to decrypt the encryption keys stored in the secure folder and to decrypt encrypted content sent to the content client using at least one of the decrypted encryption keys;

programming the content client so that at initialization of the content client the startup application is launched under the administrative account;

creating a client-specific password that is used to access the administrative account, wherein the startup application is further programmed to recreate the client-specific password from an identification password stored in the secure folder and at least one persistent attribute of the content client.

2. The tangible computer-readable medium of claim 1, wherein the operations further comprise:

sending the encrypted content to the content client, the encrypted content being encrypted using at least one of the encryption keys.

3. The tangible computer-readable medium of claim 1 wherein the client-specific password is based on an identification password and the at least one persistent attribute of the content client.

4. The tangible computer-readable medium of claim 3 wherein the at least one persistent attribute of the content client includes an identifier of a processor of the content client.

5. The tangible computer-readable medium of claim 3 wherein the at least one persistent attribute of the content client includes an identifier of a network card of the content client.

6. The tangible computer-readable medium of claim 3 wherein the at least one persistent attribute of the content client includes an identifier derived from a hardware configuration of the content client.

7. The tangible computer-readable medium of claim 1 wherein the startup application is further programmed to use the recreated client-specific password to launch the decryption application.

8. The tangible computer-readable medium of claim 1 wherein the encrypted content is encrypted by serially applying the at least one of the encryption keys.

9. The tangible computer-readable medium of claim 8 wherein the content client decrypts the encrypted content by serially applying the at least one of the decrypted encryption keys in reverse order of encryption.

10. The tangible computer-readable medium of claim 1 wherein the content is a package of images to be displayed by the content client.

11. The tangible computer-readable medium of claim 1 wherein an encryption key is an asymmetrical pair of keys, one of the keys being stored in the secure folder and the other of the keys being used to encrypt the encrypted content.

12. A tangible computer-readable medium having stored thereon instructions that, if executed by a computing system having a processor, cause the computing system to perform operations for distributing content, the operations comprising:

creating an administrative account on a content client;

storing encryption keys in a secure folder of the content client;

installing on the content client a decryption application, the decryption application programmed to decrypt encrypted content sent to the content client using at least one of the encryption keys;

installing on the content client a startup application, the startup application programmed to recreate the client-specific password from an identification password stored in the secure folder and from at least one persistent attribute of the content client;

programming the content client so that at initialization of the content client the decryption application is launched under the administrative account; and creating a client-specific password that is used to access the administrative account.

13. The tangible computer-readable medium of claim 12, wherein the operations further comprise:

sending the encrypted content to the content client, the encrypted content being encrypted using at least one of the encryption keys.

14. The tangible computer-readable medium of claim 12 wherein the encryption keys are encrypted.

15. The tangible computer-readable medium of claim 12 wherein the client-specific password is based on an identification password and the at least one persistent attribute of the content client.

16. The tangible computer-readable medium of claim 12 wherein the startup application uses the recreated client-specific password to launch the decryption application.

17. The tangible computer-readable medium of claim 12 wherein the encrypted content is encrypted by serially applying the at least one of the encryption keys.

18. The tangible computer-readable medium of claim 17 wherein the content client decrypts the encrypted content by serially applying the at least one of the decrypted encryption keys in reverse order of encryption.

19. The tangible computer-readable medium of claim 12 wherein the content is a package of images to be displayed by the content client.

20. The tangible computer-readable medium of claim 12 wherein an encryption key is an asymmetrical pair of keys, one of the keys being stored in the secure folder and the other of the keys being used to encrypt the encrypted content.

21. A client system including a processor and memory, the client system comprising:

an administrative account stored in the memory and accessible with a client-specific password derived from an identification password and at least one persistent attribute of the client system;

a secure folder stored in the memory and containing the identification password and a plurality of encryption keys; and a startup application stored in the memory and when executed by the processor causes the client system to perform the following operations:

recreate the client-specific password based on the identification password stored in the secure folder and the at least one persistent attribute of the client system, and launch a decryption application in the administrative account using the recreated client-specific password, the encryption keys stored in the secure folder being accessible to the decryption application for decrypting content sent to the client system, wherein the client system is configured so that at initialization of the client system the startup application is launched under the administrative account.

22. The client system of claim 21 wherein the identification password stored in the secure folder is encrypted.

23. The client system of claim 21 wherein the content includes images distributed by a distribution server.

24. A method, performed by a computer system having a processor, comprising:

creating, with the processor, an administrative account on a content client;

storing encryption keys in a secure folder of the content client, wherein the secure folder is accessible via the administrative account;

installing a decryption application on the content client, the decryption application being configured to decrypt encrypted content received by the content client using at least one of the encryption keys;

programming the content client to launch the decryption application under the administrative account during initialization of the content client;

creating a client-specific password for accessing the administrative account; and recreating, by a startup application, the client-specific password from an identification password stored in the secure folder and from at least one persistent attribute of the content client.

25. The method of claim 24 wherein the encryption keys are encrypted.

26. The method of claim 24 wherein the client-specific password is based on an identification password and the at least one persistent attribute of the content client.

27. The method of claim 24 wherein the startup application is configured to use the recreated client-specific password to launch the decryption application.

28. The method of claim 24 wherein the encrypted content is encrypted by serially applying the at least one of the encryption keys.

29. The method of claim 28 wherein the content client decrypts the encrypted content by serially applying the at least one of the decrypted encryption keys in reverse order of encryption.

30. The method of claim 24 wherein the content is a package of images to be displayed by the content client.

31. The method of claim 24 wherein an encryption key is an asymmetrical pair of keys, one of the keys being stored in the secure folder and the other of the keys being used to encrypt the encrypted content.

32. The client system of claim 21 wherein the at least one persistent attribute of the client system includes an identifier of a processor of the client system.

33. The client system of claim 21 wherein the at least one persistent attribute of the client system includes an identifier of a network card of the client system.

34. The client system of claim 21 wherein the at least one persistent attribute of the client system includes an identifier derived from a hardware configuration of the client system.

35. The client system of claim 21 wherein the identification password is received from a user.

* * * * *

UNITED STATES PATENT AND TRADEMARK OFFICE
CERTIFICATE OF CORRECTION

PATENT NO. : 8,260,710 B2
APPLICATION NO. : 12/581077
DATED : September 4, 2012
INVENTOR(S) : Lipsky et al.

It is certified that error appears in the above-identified patent and that said Letters Patent is hereby corrected as shown below:

On the Title Page, in item (73), under "Assignee", in Column 1, Line 1,
delete "Eqapez Foundation, L.L.C." and
insert -- Eqapez Foundation, L.L.C., Dover, DE (US) --, therefor.

Signed and Sealed this
Ninth Day of April, 2013

Teresa Stanek Rea
*Acting Director of the United States Patent and Trademark Office*